United States Patent
Gunacker et al.

(10) Patent No.: US 7,100,742 B2
(45) Date of Patent: Sep. 5, 2006

(54) METHOD FOR CONTROLLING THE DELIVERY OF LUBRICANT

(75) Inventors: Christian Gunacker, Vienna (AT); Richard Gunacker, Kasten (AT)

(73) Assignee: Hy-Power Flexomatic Hydraulik Handelsges M.b.H., Tullnerbach (AT)

( * ) Notice: Subject to any disclaimer, the term of this patent is extended or adjusted under 35 U.S.C. 154(b) by 0 days.

(21) Appl. No.: 10/110,385

(22) PCT Filed: Aug. 10, 2001

(86) PCT No.: PCT/AT01/00266

§ 371 (c)(1),
(2), (4) Date: Aug. 20, 2002

(87) PCT Pub. No.: WO02/14134

PCT Pub. Date: Feb. 21, 2002

(65) Prior Publication Data

US 2003/0102188 A1 Jun. 5, 2003

(30) Foreign Application Priority Data

Aug. 11, 2000 (AT) .................................. 1394/2000

(51) Int. Cl.
*B61K 3/00* (2006.01)
(52) U.S. Cl. ...................................................... 184/3.1
(58) Field of Classification Search ................ 184/3.1, 184/3.2, 15.1–15.3
See application file for complete search history.

(56) References Cited

U.S. PATENT DOCUMENTS

| 4,738,336 A | * | 4/1988 | Smith et al. | 184/6.4 |
| 5,129,606 A | * | 7/1992 | Rodems et al. | 246/249 |
| 5,285,457 A | * | 2/1994 | Funakubo et al. | 340/635 |

FOREIGN PATENT DOCUMENTS

| DE | 4141049 A1 | * | 7/1992 |
| EP | 0 787 638 | | 8/1997 |
| JP | 04081655 A | * | 3/1992 |

* cited by examiner

*Primary Examiner*—Chong H. Kim
(74) *Attorney, Agent, or Firm*—Reed Smith LLP

(57) ABSTRACT

The invention is directed to a method for controlling the delivery of lubricant between two parts which are movable relative to one another, in particular for lubricating rails, above all on curved tracks, in order to prevent or reduce squealing noises, wherein at least one sensor, e.g., a microphone, is provided for picking up sound vibrations, particularly structure-borne sound vibrations, the signal of the sensor being fed to a selective amplifier, e.g., an active bandpass filter, and used as an actuating variable for initiating the delivery of lubricant. For this purpose, at least two frequency bands are filtered out, the intensity of the sound vibrations of the filtered frequency bands is compared, and the determined difference or the ratio of the determined values is used as an actuating variable.

4 Claims, 2 Drawing Sheets

Figure 2:
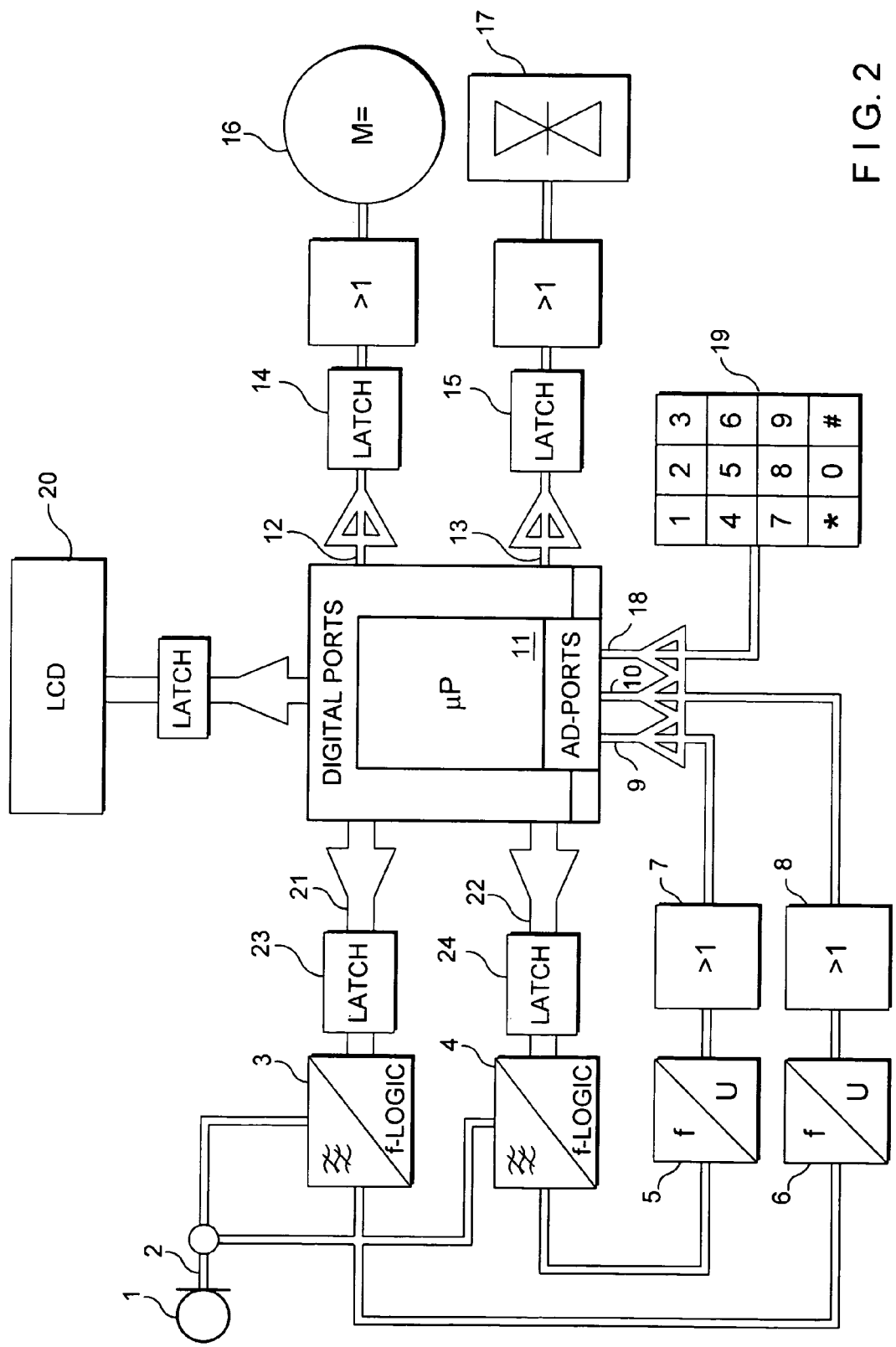

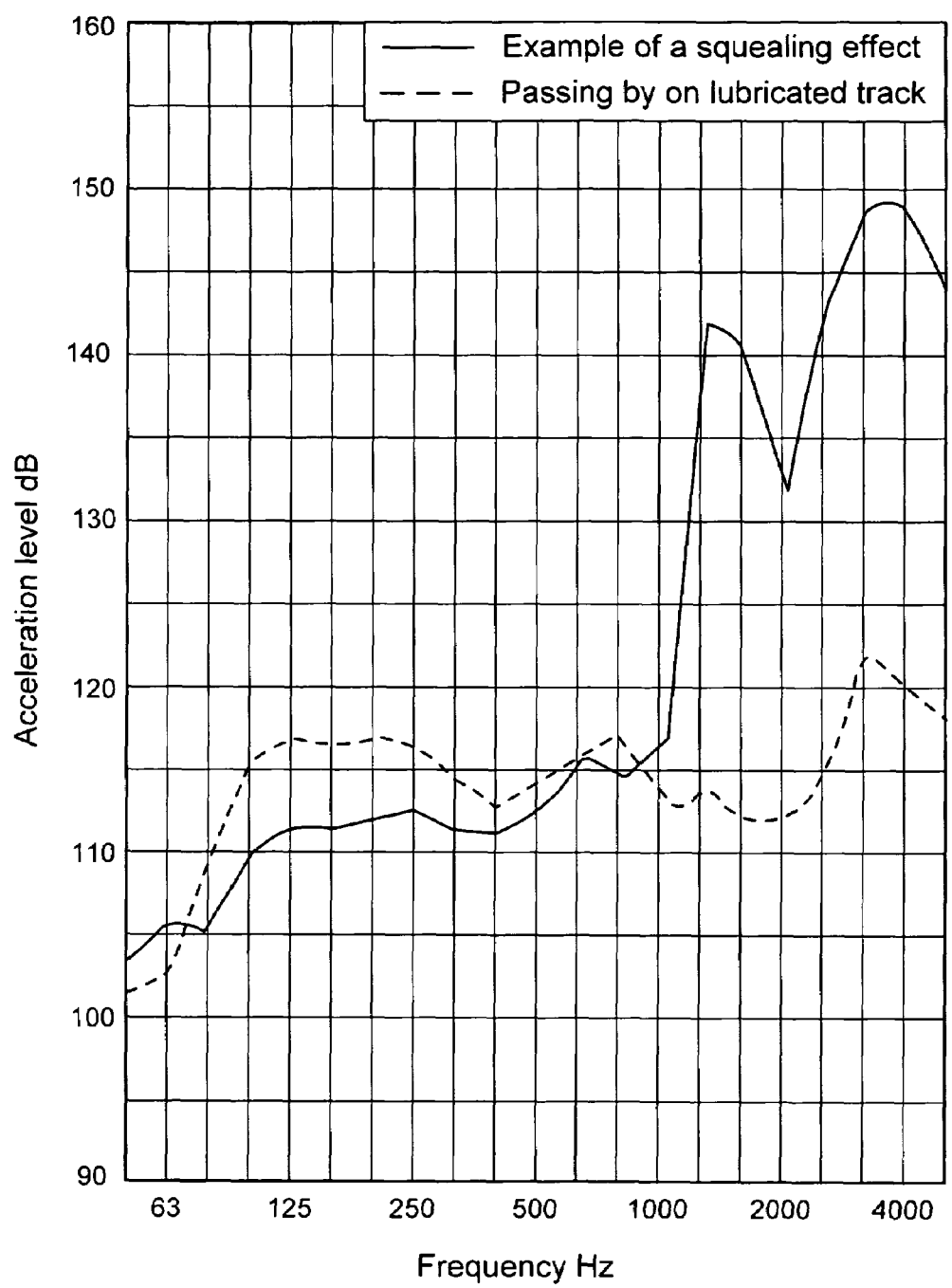
F I G. 1

METHOD FOR CONTROLLING THE DELIVERY OF LUBRICANT

The invention is directed to a method for controlling the delivery of lubricant between two parts which are movable relative to one another, in particular for lubricating rails, above all on curved tracks, in order to prevent or reduce squeaking or squealing noises. For this purpose, at least one sensor, e.g., a microphone, is provided for picking up sound vibrations, particularly structure-borne sound vibrations. The signal of the sensor is fed to a selective amplifier, e.g., an active bandpass filter, and used as an actuating variable for initiating the delivery of lubricant.

In a known arrangement by which this method may be implemented and which is intended for the lubrication of rails for rail vehicles, the structure-borne sound occurring at the rails is measured and delivery of lubricant is initiated when a determined level is reached in that frequency range in which squealing sounds predominantly occur. A procedure of this kind has the advantage that lubrication is carried out only when required, so that overlubrication is also prevented. Overlubrication must be avoided particularly in track lubrication because there would otherwise be a risk that the running surfaces of the rail wheels would likewise be lubricated, which would considerably impair braking action.

However, this known installation and the method for its operation have the disadvantage that sensor sensitivity, that is, the microphone sensitivity, can not be adjusted too extensively because, otherwise, due to the drop in the sound level when moving away from the location of origin of the squealing noise, the arrangement must either be adjusted so sensitively that a lubricating pulse would be triggered every time the measurement point is actually crossed or, when the adjustment is selected so as to be less sensitive, lubrication would not be initiated when squealing noises occur at a greater distance from the measurement point.

Therefore, it is the object of the invention to provide a method of the type mentioned above by which the triggering of the lubrication pulse can be selectively adjusted so as to enable use in fields other than rail lubrication.

According to the invention, this object is met in that at least two frequency bands are filtered out, the intensity of the sound vibrations of the filtered frequency bands is compared, and the determined difference or the ratio of the determined values is used as an actuating variable. Accordingly, no absolute values are measured which could change, e.g., depending on the distance between the occurrence of the noise and the location of the decrease in sound vibrations. Rather, a determined difference or a determined relation between the values which is not dependent on the absolute values is measured. Therefore, control pulses which enable an exact control based on the relative values can also be picked up at greater distances.

Further, by suitable selection of the frequency bands or of the critical ratio between the two frequencies, the method can also be used for monitoring a wide variety of objects where there are two parts to be lubricated which move relative to one another.

In an advantageous manner, the frequency band containing the sound vibrations of the rolling noise, as one of the frequency bands, and a frequency band containing the characteristic sound vibrations for squealing, as the second frequency band, can be filtered out and processed. In this way, the method can be adapted in an optimal manner to the lubrication of rails or of the wheel flanges of rail vehicles and, because of the exact adjustability, a device can also be used which is arranged at the corresponding vehicle, e.g., a train vehicle. The sound level of the sound vibrations in the lubricated state can be used as a reference quantity for determining the control signal which is determined by the ratio of the sound level of the sound vibrations to the measured frequency ranges. Therefore, a threshold value representing the ideal state is determined and the delivery of lubricant can then be controlled by building upon this threshold value.

The invention will be described more fully in the following with reference to the drawings.

FIG. 1 is a graph depicting the curve of vibrations when traveling over a lubricated track (dashed line) and when traveling on an unlubricated track (solid line) when a squealing effect takes place.

FIG. 2 schematically shows the control structure with respect to the delivery of lubricant according to the method according to the invention.

As can be seen from FIG. 1, the sound level moves in a rather uniform band while the train travels by over lubricated track and variations occur only between approximately 112 dB and 122 dB at frequencies from about 125 Hz to 4000 Hz and up.

In contrast, when a squealing noise or squealing effect takes place, there is a sudden rise in the sound level after about 1000 Hz. In this test, a minimum of the sound level occurs in the range of 2000 Hz, followed by a sharp increase reaching a maximum at 4000 Hz. This shows that the frequency bands characteristic of rolling noise lie in the lower frequencies, while squealing noises occur in the higher frequency range. Therefore, preferred measurement ranges are the frequency bands from approximately 400 Hz to approximately 600 Hz for the rolling noise because, as can be seen from FIG. 1, the sound level for lubricated track and unlubricated track, that is, with squealing wheels, is about the same in this range of the sound level. A range between 1000 Hz and 5000 Hz is used as the second frequency band. In the present case, the range between 3000 Hz and 4000 Hz is provided as second measurement range because there is a relatively broad area with an approximately uniform sound level.

In practice, the actual selection of the frequency range on which the measurement is based can depend on a series of additional circumstances, e.g., on the kind of objects moving in relation to one another or on the distance of the measurement point from the area to be lubricated. For example, if a chain conveyor or roller conveyor requires a different frequency band selection than a vehicle moving on rails and, with respect to the rail vehicles, when there are also differences in the type and speed of the moving vehicles, and the like, the selection of the frequency on which the measurement is based will be affected. Thus, a heavily loaded freight train will have a different rolling noise characteristic than a lightweight passenger train with passenger cars.

The monitoring unit shown in FIG. 2 is intended as a control unit of a lubricating installation such as that disclosed, e.g., in AT 400 427 B, wherein the content of this patent is adopted in the present description by reference. Naturally, the monitoring unit shown in FIG. 2 can also be used in the same way for other lubricating arrangements, e.g., for centralized triggering of lubrication on a roller table, or selectively for individual bearings which are to be monitored via separate sensor devices and lubricated.

FIG. 2 shows a sensor unit, e.g., a structure-borne sound microphone, designated by 1, whose output 2 is connected to two bandpass filters 3, 4, each of which is connected, in turn, to a device for determining the sound level 5, 6. The determined sound levels are compared by analyzers 7, 8 and supplied to a microprocessor 11 via A-D inputs 9, 10. The outputs of this microprocessor 12, 13 are connected, via logic units 14, 15, to a pump motor 16 and a valve 17, and the logic units switch the motor 16 and valve 17 on or off depending on the switching pulse sent by the microprocessor 11.

The microprocessor 11 has another A-D input 18 through which a control and adjustment of the microprocessor 11 and frequency bands of the filters and triggering level can be carried out by means of an input device 19. A display unit 20 by which the input entered by means of the input device 19 can be monitored is arranged at the microprocessor 11. Further, the microprocessor 11 has two outputs 21, 22 which are used for adjusting the selected frequency bands of the bandpass filters 3, 4 by adjusting units 23, 24.

The entire arrangement is calibrated for the operation of the lubricating unit by means of the monitoring unit shown in FIG. 2 in that the movement to which the monitoring unit should respond is detected in the lubricated state, i.e., the noise level occurring in properly lubricated sliding surfaces is detected. Based on this detected noise level, a ratio between the two measured frequency bands, e.g., a frequency band from 400–600 Hz on the one hand and a frequency band of about 3000 to 4000 Hz on the other hand, is selected and entered into the microprocessor control unit as regulating variable. When the ratio between the two adjusted frequency bands exceeds the given ratio value, a lubricating pulse is triggered.

As is set forth in AT 400 427 B, this lubricating pulse is carried out by means of a time switching element, not shown, by means of which a dwell time can also be adjusted for the installation, that is, a time period within which this installation does not respond to squealing noises or to an exceeded level, e.g., in case of rail lubrication, so as to allow the train the possibility of distributing lubricant picked up by the wheel flanges through the curve.

The method according to the invention can also be advantageously applied, e.g., in rail vehicles, when the lubricating device is arranged at a vehicle rolling on the rails rather than in a stationary manner at the rails. In this case, the lubricant can be delivered directly to the wheel flange on this vehicle, specifically, in an amount which is exactly sufficient for preventing the squealing noise. As was already mentioned, an excess of lubricant on the rail, e.g., in rail vehicles, could cause all of the vehicles rolling on the rail to slide, above all in the event of emergency braking, and the braking distance would therefore be considerably longer.

The sound characteristic which changes as a result of the distance between the decrease in sound and the occurrence of the squealing noise could also be used, in a manner not shown, for selective lubrication of individual bearings, e.g., in a roller conveyor.

What is claimed is:

1. A method for controlling the delivery of lubricant between two parts which are movable relative to one another in order to prevent or reduce squealing noises, comprising the steps of:

providing at least one sensor, for picking up sound vibrations, and structure-borne sound vibrations;

feeding the signal of the sensor to a selective amplifier having an active band-pass filter; and using said signal as an actuating variable for initiating the delivery of lubricant;

filtering out at least two frequency bands;

comparing the intensity of the sound vibrations of the at least two filtered frequency bands; and using the determined difference or the ratio of the determined values as an actuating variable for controlling the delivery of the lubricant between the two parts which are movable.

2. The method of claim 1, wherein the sensor is a microphone.

3. The method according to claim 1, wherein the frequency band containing the sound vibrations of the rolling noise, as one of the frequency bands, and a frequency band containing the characteristic sound vibrations for squealing, as the second frequency band, are filtered out and processed.

4. The method according to claim 3, wherein the sound level of the sound vibrations in the lubricated state is used a reference quantity for determining the control signal which is determined by the ratio of the sound level of the sound vibrations to the measure frequency ranges.

* * * * *